United States Patent
Huang (10) Patent No.: US 10,748,266 B2
(45) Date of Patent: Aug. 18, 2020

(54) METHOD FOR PROCESSING IMAGE, DEVICE FOR PROCESSING IMAGE, ELECTRONIC DEVICE AND MEDIUM

(71) Applicant: BEIJING KINGSOFT INTERNET SECURITY SOFTWARE CO., LTD., Beijing (CN)

(72) Inventor: Jhihlin Huang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 134 days.

(21) Appl. No.: 16/121,723

(22) Filed: Sep. 5, 2018

(65) Prior Publication Data
US 2019/0102871 A1    Apr. 4, 2019

(30) Foreign Application Priority Data
Sep. 30, 2017    (CN) .......................... 2017 1 0917557

(51) Int. Cl.
*G06T 11/60* (2006.01)
*G06T 5/50* (2006.01)
(Continued)

(52) U.S. Cl.
CPC .................. *G06T 5/50* (2013.01); *G06T 7/70* (2017.01); *G06T 15/20* (2013.01); *G06T 15/506* (2013.01); *G06T 15/60* (2013.01); *H04N 5/2351* (2013.01); *H04N 5/243* (2013.01); *H04N 5/247* (2013.01); *H04N 9/77* (2013.01); *H04N 13/111* (2018.05);
(Continued)

(58) Field of Classification Search
CPC ........... G06T 5/50; G06T 15/60; G06T 15/20; G06T 15/506; G06T 7/70; G06T 2207/20221; G06T 2200/24; H04N 13/204; H04N 13/15; H04N 5/243; H04N 9/77; H04N 13/111; H04N 5/247; H04N 5/2351; H04N 1/6086
See application file for complete search history.

(56) References Cited

U.S. PATENT DOCUMENTS

| 2010/0164718 A1* | 7/2010 | Parish ..................... G01N 21/64 340/540 |
| 2017/0230585 A1* | 8/2017 | Nash ......................... G06T 5/50 |

(Continued)

FOREIGN PATENT DOCUMENTS

CN    106296621 A    1/2017

OTHER PUBLICATIONS

Office Action issued in corresponding Chinese Application No. 201710917557.5 dated May 7, 2019, and English translation thereof (14 pages).

*Primary Examiner* — Howard D Brown, Jr.
(74) *Attorney, Agent, or Firm* — Osha Liang LLP (57) ABSTRACT

Embodiments of the present disclosure provide a method for processing an image, a device for processing an image, an electronic device and a medium. The method includes the followings. A target image is captured. Capturing ambient information when the target image is captured is detected. A material required is acquired. A default display effect of the material is adjusted according to the capturing ambient information, to obtain a target display effect matching with the capturing ambient information. The material having the target display effect is merged with the target image, to obtain a merged image.

17 Claims, 3 Drawing Sheets

(51) Int. Cl.
  *G06T 7/70* (2017.01)
  *H04N 5/235* (2006.01)
  *H04N 5/247* (2006.01)
  *G06T 15/50* (2011.01)
  *H04N 13/111* (2018.01)
  *H04N 9/77* (2006.01)
  *G06T 15/20* (2011.01)
  *G06T 15/60* (2006.01)
  *H04N 5/243* (2006.01)
  *H04N 1/60* (2006.01)

(52) U.S. Cl.
  CPC ............... *G06T 2200/24* (2013.01); *G06T 2207/20221* (2013.01); *H04N 1/6086* (2013.01)

(56) References Cited

U.S. PATENT DOCUMENTS

| | | | |
|---|---|---|---|
| 2018/0089874 A1* | 3/2018 | Wu | G06T 11/60 |
| 2018/0160046 A1* | 6/2018 | Nash | H04N 5/23296 |

* cited by examiner

METHOD FOR PROCESSING IMAGE, DEVICE FOR PROCESSING IMAGE, ELECTRONIC DEVICE AND MEDIUM

CROSS REFERENCE TO RELATED APPLICATION

This application is based upon and claims a priority to Chinese Patent Application Serial No. 201710917557.5, filed with the State Intellectual Property Office of P. R. China on Sep. 30, 2017, the entire contents of which are incorporated herein by reference.

TECHNICAL FIELD

The present disclosure relates to the field of image processing technology, and more particularly, to a method for processing an image, a device for processing an image, an electronic device and a medium.

BACKGROUND

With popularity of electronic devices, users are increasingly favored of capturing images and recording lives using a capturing capability of the electronic devices. In addition, in order to make the images captured more interesting, various applications for prettifying the images or adding a specific effect to the images are developed.

The user may select his/her favorite material according to his/her own demands from all materials carried in the application to process the image and to make the image livelier and more interesting.

SUMMARY

Embodiments of a first aspect of the present disclosure provide a method for processing an image. The method includes:
capturing a target image;
detecting capturing ambient information when capturing the target image;
acquiring a material required;
adjusting a default display effect of the material according to the capturing ambient information to obtain a target display effect matching with the capturing ambient information; and
merging the material having the target display effect with the target image to obtain a merged image.

Embodiments of a second aspect of the present disclosure provide a device for processing an image. The device includes a capturing module, a detecting module, an acquiring module, an adjusting module and a merging module.

The capturing module is configured to capture a target image.

The detecting module is configured to detect capturing ambient information when the target image is captured.

The acquiring module is configured to acquire a material required.

The adjusting module is configured to adjust a default display effect of the material according to the capturing ambient information to obtain a target display effect matching with the capturing ambient information.

The merging module is configured to merge the material having the target display effect with the target image to obtain a merged image.

Embodiments of a third aspect of the present disclosure provide an electronic device. The electronic device includes a housing, a processor, a memory, a circuit board and a power supply circuit. The circuit board is enclosed by the housing. The processor and the memory are positioned on the circuit board. The power supply circuit is configured to provide power for respective circuits or components of the electronic device. The memory is configured to store executable program codes. The processor is configured to run programs corresponding to the executable program codes by reading the executable program codes stored in the memory, to execute the method for processing an image provided in embodiments of the first aspect of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Detailed descriptions will be made to embodiments of the present disclosure. Examples of the embodiments are shown in accompanying drawings, where same or similar elements and the elements having same or similar functions are denoted by like reference numerals throughout the descriptions. The following embodiments described with reference to the drawings are exemplary, are intended to explain the present disclosure, and are not construed to limit the present disclosure.

In practical applications, since the materials carried in the application are designed in advance, a situation where a display effect of the selected material is not adapted to a capturing environment may occur, thereby resulting in a technical problem of a poor effect of image processing.

Regarding to an existing technical problem of a poor effect of image processing due to a situation where the display effect of the material is not adapted to the capturing environment may occur since the material carried in an application is designed in advance, embodiments of the present disclosure modify a display effect of the material according to capturing ambient information of a capturing environment where a captured object is located, thereby causing that the display effect of the material is adapted to the capturing environment, improving the effect of image processing and improving user's capturing experience.

A method for processing an image, a device for processing an image, an electronic device and a medium according to embodiments of the present disclosure will be described with reference to the drawings.

Figure 1:
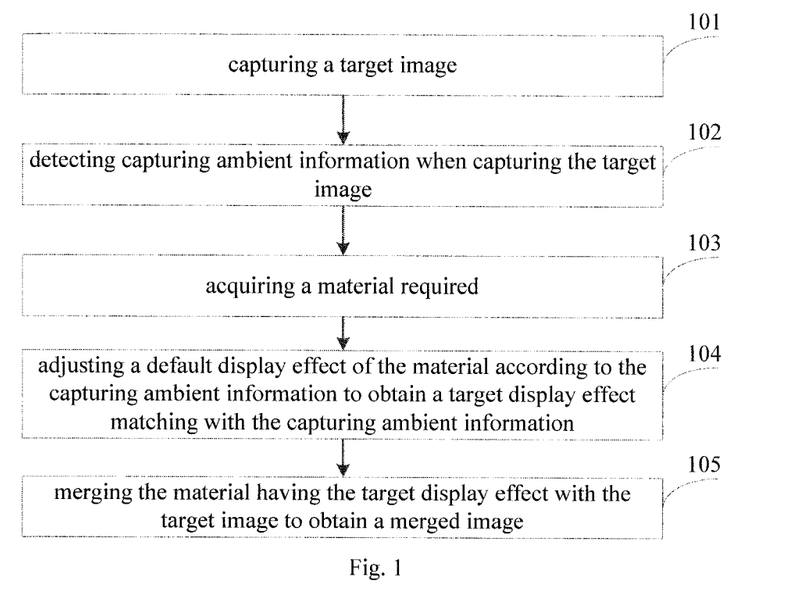
FIG. 1 is a flow chart illustrating a method for processing an image provided in embodiments of the present disclosure.

FIG. 1 is a flow chart illustrating a method for processing an image provided in embodiments of the present disclosure.

As illustrated in FIG. 1, the method for processing an image includes the followings.

At block 101, a target image is captured.

An executive body of embodiments of the present disclosure is an electronic device having a capability of capturing, such as a mobile terminal, a smart camera, or the like, which is not limited herein.

The mobile terminal may be a hardware device having various operation systems, such as a smart phone, a tablet computer, a personal digital assistance, an E-book or the like.

In specific implementations, a camera of the electronic device may be orientated to the captured object, such that a user may trigger a capturing button arranged on the electronic device to capture a target object. Alternatively, the user may capture the target image using the electronic device arranged on a selfie stick, for example, when the user triggers a button for capturing the target object arranged on the selfie stick.

The captured object may be a scenario, a figure, a scene or the like which needs to be captured through the electronic device by the user.

At block 102, capturing ambient information is detected when the target object is captured.

In embodiments of the present disclosure, the capturing ambient information includes an illumination angle of a light source and/or a capturing angle, etc. The capturing angle includes a capturing height, a capturing direction and a capturing distance. The capturing height includes capturing horizontally, capturing at a depression angle, and capturing at an elevation angle. The capturing direction includes front capturing, side capturing, oblique-side capturing and rear capturing. The capturing distance refers to a distance from the electronic device to the captured object.

For example, when the capturing ambient information is the illumination angle of the light source for capturing, the light intensity of the capturing ambient information of the capturing environment where the captured object is located may be obtained through photosensitive elements included in the camera of the electronic device. According to the obtained light intensity, the illumination angle of the light source for capturing included in the capturing ambient information is determined.

Alternatively, when the capturing ambient information is the capturing angle, the capturing angle when the target object is captured may also be obtained through the camera of the electronic device.

At block 103, a material required is acquired.

In embodiments, an application of the electronic device may store a library of materials for adjusting the target image. In the library of materials, various materials are stored. For example, the material may be a tag, a poster, a filter or the like. The application of the electronic device may download new materials in real time from a server, and the newly downloaded materials may be stored to the library of materials.

In detail, after the target image is captured by the user, the target image may be prettified or may be added with a specific effect according to his demands. For example, the user may select one of materials from the library as the material required by touching a screen of the electronic device. The electronic device may monitor the touch operation of the user in real time. After it is monitored that the touch operation is done, a region corresponding to the touch operation may be identified. The background may analyze a material corresponding to the identified region, so as to further determine that this material is the material required by the user.

At block 104, a default display effect of the material is adjusted according to the capturing ambient information, to obtain a target display effect in conformity with the capturing ambient information.

It may be understood that, when the capturing ambient information for capturing the target image changes, a situation that the display effect of the material is not adapted to the capturing environment where the captured object is located may occur. For example, when the captured object is facing to a light source, a high-brightness region and a shadow region may be notably presented in the target image captured, while the display effect of the material is systemically defaulted. It is impossible to automatically adjust the high-brightness region and the shadow region of the display effect of the material according to the capturing environment where the captured object is located. Alternatively, when the captured object is facing away from the light source, colors of the target image captured are relatively soft and brightness is relatively low. It is also impossible to perform a brightness adjustment and/or a color-saturation adjustment on the display effect of the material according to the capturing environment where the captured object is located.

Therefore, in embodiments, in order to make the display effect of the material in conformity with the capturing environment where the captured object is located, the user may adjust the default display effect of the material according to the capturing ambient information, to obtain the target display effect matching to the capturing ambient information.

For example, when the captured object is facing to the light source, the captured target image may include a high-brightness region and a shadow region since the light is relatively strong. Therefore, in embodiments, a 3D (three-dimensional) model may be built for the material, to obtain a stereoscopic model of the material. In a virtual stereoscopic space, a virtual light source may be built and the virtual light source is configured to illuminate the material at the illumination angle of the light source for capturing. Therefore, the high-brightness region and the shadow region of the stereoscopic model of the material may be obtained. The default display effect may be adjusted according to the high-brightness region and the shadow region, to obtain the target display effect matching to the capturing ambient information.

Alternatively, when the captured object is facing away from the light source and the light is relatively soft, in the captured target image, brightness of the background may be relatively high while the brightness of the captured object may be relatively low and the colors of the captured object may be soft. The brightness adjustment and/or the color-saturation adjustment may be performed on the default display effect of the material based on the light intensity of the capturing environment where the captured object is located, to obtain the target display effect matching with the capturing ambient information.

At block 105, the material having the target display effect is merged with the target image, to obtain a merged image.

In embodiments, after the target display effect matching with the capturing ambient information is obtained by adjusting the default display effect of the material based on the capturing ambient information, the material having the target display effect may be merged with the target image, to obtain the merged image. Therefore, the display effect of the material may be adapted to the capturing environment, thereby improving user's capturing experience.

With the method for processing an image according to embodiments, by capturing the target image, by detecting the capturing ambient information when capturing the target object, by acquiring the material acquired, by adjusting the default display effect of the material according to the capturing ambient information so as to obtain the target display effect matching to the capturing ambient information, and by merging the material having the target display effect with the target image, the merged image is obtained. Consequently, the display effect of the material may be automatically adjusted according to the capturing ambient information of a capturing environment where a captured object is located, thereby causing that the display effect of the material is adapted to the capturing environment, improving an effect of image processing and improving user's capturing experience. The method solves a technical problem, existing in related arts, of a poor effect of image processing due to a situation where the display effect of the material is not adapted to the capturing environment may occur since the material carried in an application is designed in advance.

In order to illustrate clearly above embodiments, embodiments provide another method for processing an image.

Figure 2:
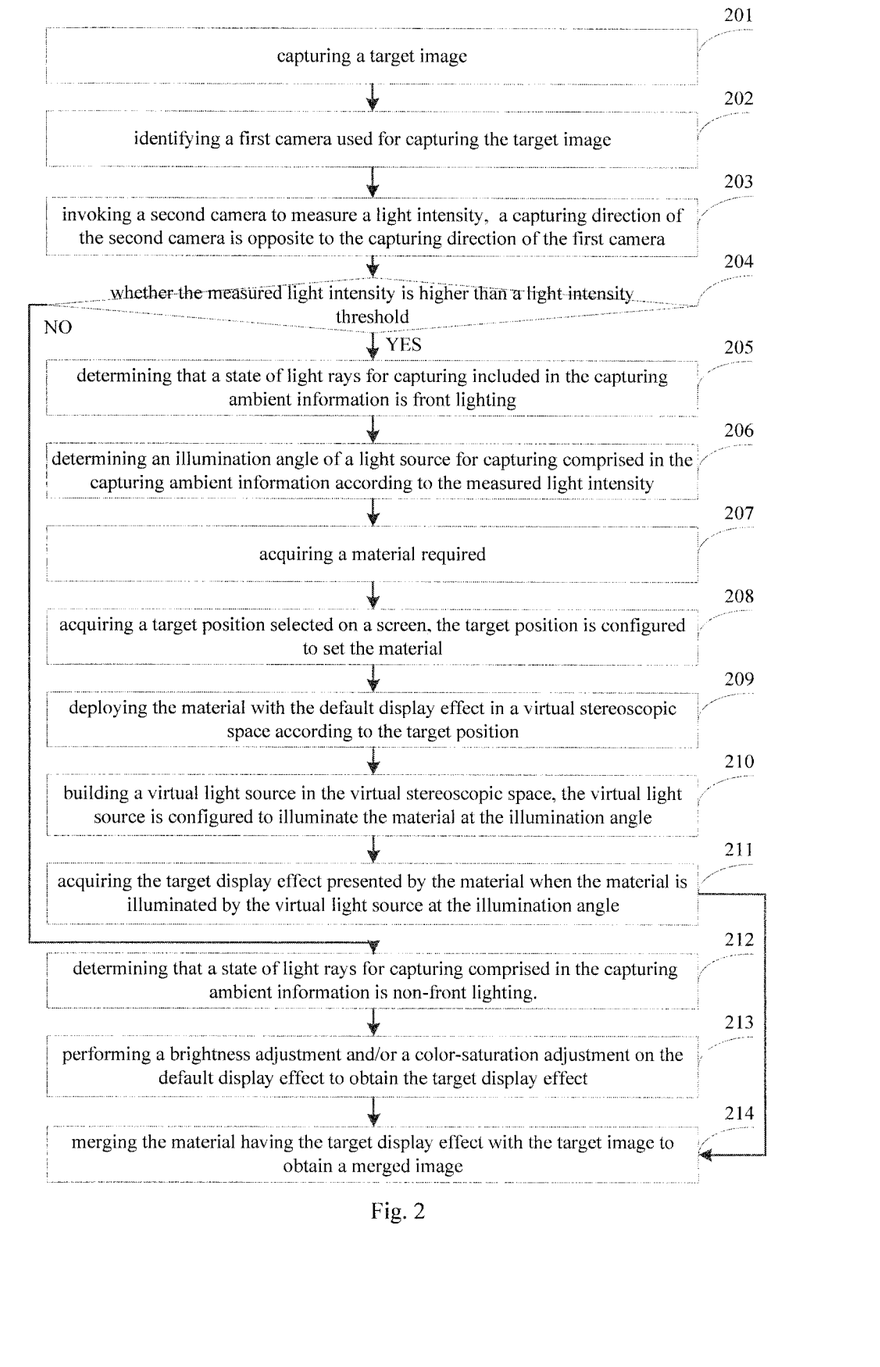
FIG. 2 is a flow chart illustrating another method for processing an image provided in embodiments of the present disclosure.

FIG. 2 is a flow chart illustrating another method for processing an image provided in embodiments of the present disclosure.

As illustrated in FIG. 2, the method for processing an image includes the followings.

At block 201, a target image is captured.

Execution details of this step 201 may be referred to that made to above embodiments, which are not elaborated herein.

At block 202, a first camera used for capturing the target image is identified.

In embodiments, the first camera may be for example a front camera of an electronic device, and the user may capture a selfie using the front camera. Alternatively, a second camera may be a rear camera of the electronic device, and the user may shoot a scene or a figure using the rear camera.

In practical applications, when the target image is captured by the user using the electronic device, the electronic device may automatically identify the first camera used for capturing the target image, that is, the electronic device may identify whether the first camera is a front camera or a rear camera.

At block 203, a second camera is invoked to measure a light intensity. A capturing direction of the second camera is opposite to the capturing direction of the first camera.

In embodiments, when the first camera is a front camera, the second camera may be a rear camera. Alternatively, when the first camera is a rear camera, the second camera may be a front camera. This is because the capturing direction of the camera for capturing is opposite to a captured surface of the captured object. Further, in the electronic device, such as a mobile terminal, two cameras with opposite capturing directions may generally be set, such that when one of the two cameras is orientated to the captured object for capturing, the other one is orientated similarly to an orientation of a captured surface of the captured object. Therefore, the environment sensed by the other camera resembles the capturing environment that the captured object is suffered to.

In specific implementations, the second camera may be invoked, such that photosensitive elements of the second camera may be used to measure the light intensity. The photosensitive elements may be configured to receive an optical single from the capturing environment, to convert the optical signal to an electric signal, and to identify the light intensity of the capturing environment according to the level of the electric signal.

At block 204, it is determined whether the measured light intensity is higher than a light intensity threshold; a block 205 is executed if the measured light intensity is higher than the light intensity threshold; a block 212 is executed otherwise.

In embodiments of the present disclosure, the light intensity threshold may be set in advance by a stored program in the electronic device, or the light intensity threshold may be set by the user, which is not limited herein.

At block 205, it is determined that a state of light rays for capturing included in the capturing ambient information is front lighting.

Alternatively, when the measured light intensity is higher than the light intensity threshold, it is indicated that the captured surface of the captured object is facing to the light source. Therefore, it may be determined that the state of the light rays for capturing included in the capturing ambient information is front lighting.

At block 206, an illumination angle of a light source for capturing included in the capturing ambient information is determined according to the measured light intensity.

When the state of the light rays for capturing included in the capturing ambient information is the front lighting, it also needs to determine the illumination angle of the light source for capturing. Therefore, in embodiments of the present disclosure, the illumination angle of the light source for capturing included in the capturing ambient information may be determined according to the measured light intensity.

As a possible implementation of embodiments of the present disclosure, a correspondence between the light intensities and the illumination angles of the light source for capturing is stored in advance. Therefore, after the measured light intensity is obtained, the illumination angle of the light source for capturing corresponding to the measured light intensity may be obtained by looking up the correspondence.

At block 207, a material required is acquired.

Execution processes of the block 207 may be referred to above embodiments, which are not elaborated herein.

At block 208, a target position selected on a screen is acquired. The target position is configured to set the material.

In embodiments, the target position where the material is desired to be located is determined according to actual demands of the user. Generally, the user may select one target position through a touch operation or in a movement way. The target position may be a point or a region. For example, the user may touch the screen once, and a circular region may be defined with a preset radius. The circular region is thus the target position selected by the user. As another example, the user may continuously drag his/her finger on the screen to define a square, a circle, an oval or the like, and the target position selected by the user is obtained according to dragging tracks of the finger.

After the target position is selected by the user, the electronic device may be configured to acquire the target position selected by the user on the screen.

At block 209, the material having the default display effect is deployed in the virtual stereoscopic space based on the target position.

Since each material has its own default display effect, in embodiments, after the target position is selected by the user on the screen, the material having its individual default display effect may be deployed in the virtual stereoscopic space according to the target position.

At block 210, a virtual light source is built in the virtual stereoscopic space. The virtual light source is configured to illuminate the material at the illumination angle of the light source for capturing.

In order to make the display effect of the material matching to the capturing ambient information, the virtual light source may be built in the virtual stereoscopic space. The material may be illuminated by the virtual light source at the illumination angle of the light source for capturing included in the capturing ambient information that the captured object is suffered to.

At block 211, the target display effect presented by the material is acquired when the material is illuminated by the virtual light source at the illumination angle of the light source for capturing.

In practical applications, when the captured object is facing to the light source, the high-brightness region and the shadow region existing in the target image captured may be notably. Thus, the display effect of the material may be not adapted to the capturing environment where the captured object is located. Therefore, in embodiments, in order to make that the display effect of the material is in conformity with the capturing environment where the captured object is located, a high-brightness region and a shadow region of the material may be automatically adjusted according to the illumination angle of the light source for capturing. In detail, a simulation may be performed based on a stereoscopic model of the material to determine the high-brightness region and the shadow region in the stereoscopic model when the material is illuminated by the virtual light source at the illumination angle of the light source for capturing. Therefore, the default display effect may be adjusted based on the determined high-brightness region and the shadow region, to obtain the target display effect matching to the capturing ambient information.

At block 212, it is determined that the state of the light rays for capturing is non-front lighting.

The direction of light rays includes front lighting, back lighting, edge lighting, front-edge lighting, back-edge lighting, top lighting, bottom lighting or the like. In embodiments the non-front lighting includes back lighting, edge lighting, front-edge lighting, back-edge lighting, top lighting, bottom lighting or the like.

The front lighting refers to that a direction of shooting an object is same to a direction of light rays. The back lighting refers to that the direction of shooting an object is opposite to the direction of the light rays. The edge lighting refers to that the direction of shooting an object is perpendicular to the direction of the light rays. The front-edge lighting refers to that an angle defined between the direction of shooting an object and the direction of the light rays is a sharp angle. The back-edge lighting refers to that an angle defined between the direction of shooting an object and the direction of the light rays is an obtuse angle. The top lighting refers to that the light rays are from the top. The bottom lighting refers to that the light rays are from the bottom.

Alternatively, when the measured light intensity is smaller than or equal to the light intensity threshold, it is indicated that the capturing surface of the captured object is faced away from the light source. Therefore, it may be determined that the state of the light rays for capturing included in the capturing ambient information is the non-front lighting.

At block 213, a brightness adjustment and/or a color-saturation adjustment is performed on default display effect, according to the light intensity measured by the second camera, to obtain the target display effect.

It may be understood that, when the state of the light rays for capturing included in the capturing ambient information is the non-front lighting, colors of the target image captured are relatively soft and the brightness of the target image is relatively low. Thus, it may cause that the brightness and/or the color saturation of the material do not conform to those of the target image captured. Therefore, in embodiments, the brightness and/or the color saturation of the default display effect may be adjusted according to the light intensity measured by the second camera. In detail, the greater the difference between the measured light intensity and the light intensity threshold, the greater the degree of adjustment, while the smaller the difference between the measured light intensity and the light intensity threshold, the smaller the degree of adjustment. And then, the adjusted display effect may be obtained as the target display effect.

At block 214, the material having the target display effect is merged with the target image, to obtain a merged image.

Execution processes of the block 214 may be referred to above embodiments, which are not elaborated herein.

With the method for processing an image according to embodiments, by capturing the target image, by detecting the capturing ambient information when capturing the target object, by acquiring the material acquired, by adjusting the default display effect of the material according to the capturing ambient information so as to obtain the target display effect matching to the capturing ambient information, and by merging the material having the target display effect with the target image, the merged image is obtained. Consequently, the display effect of the material may be automatically adjusted according to the capturing ambient information of a capturing environment where a captured object is located, thereby causing that the display effect of the material is adapted to the capturing environment, improving an effect of image processing and improving user's capturing experience.

As a possible implementation of embodiments of the present disclosure, the capturing ambient information includes a capturing angle. In embodiments of the present disclosure, no matter whether the state of the light rays for capturing is the front lighting or the non-front lighting, a view angle of a visible region of the material may be adjusted by the user based on the capturing angle. The above process may be described in detail with reference to FIG. 3.

Figure 3:
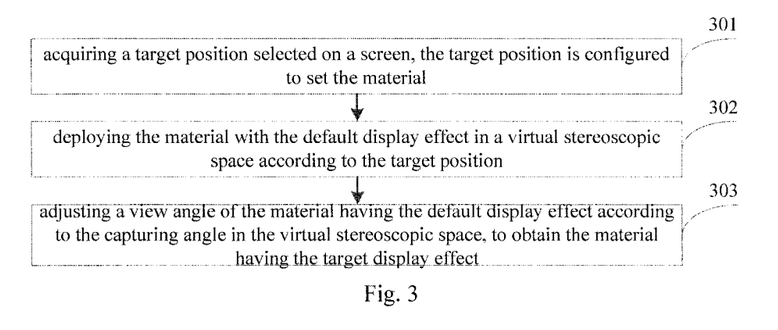
FIG. 3 is a flow chart illustrating still another method for processing an image provided in embodiments of the present disclosure.

FIG. 3 is a flow chat illustrating another method for processing an image provided in embodiments of the present disclosure.

Referring to FIG. 3, the method for processing an image includes the followings.

At block 301, the target position selected on the screen is acquired. The target position is configured to set the material.

At block 302, the material having the default display effect is deployed in the virtual stereoscopic space based on the target position.

Execution processes of the block 301 and the block 302 may be referred to above embodiments, which are not elaborated herein.

At block 303, a view angle of the material having the default display effect is adjusted according to the capturing angle in the virtual stereoscopic space, to obtain the material having the target display effect.

It may be understood that, when the captured object is shot at different capturing angles, the brightness, the color saturation, the high brightness region and/or the shadow region are inconsistent from each other for different target images. In order to make the display effect of the material in conformity with the capturing environment where the captured object is located, in embodiments, the view angle of the default display effect of the material may be adjusted according to the capturing angle in the virtual stereoscopic space to obtain the material having the object display effect.

As an example, when the capturing angle is a depression angle, after the target image is obtained by capturing the captured object at the depression angle by the user, in order to avoid a misfit between the material selected from library of materials and the target image if the material is a group photo of persons, and in order to make the display effect of the merged image obtained by merging the target image with the material being non-contradict, the group photo may be adjusted with a display effect captured at the depression angle.

With the method for processing an image according to embodiments, by acquiring the target position selected on the screen, by deploying the material having the default display effect in the virtual stereoscopic space based on the target position, and by adjusting the view angle of the material having the default display effect according to the capturing angle, the material having the target display effect is obtained. Consequently, it may realize to adjust the view angle of the visible region of the material by the user according to the capturing angle, thereby making that the display effect of the material matches to the capturing environment, improving an effect of image processing, and improving user's capturing experience.

In order to achieve above embodiments, embodiments of the present disclosure further provide a device for processing an image.

Figure 4:
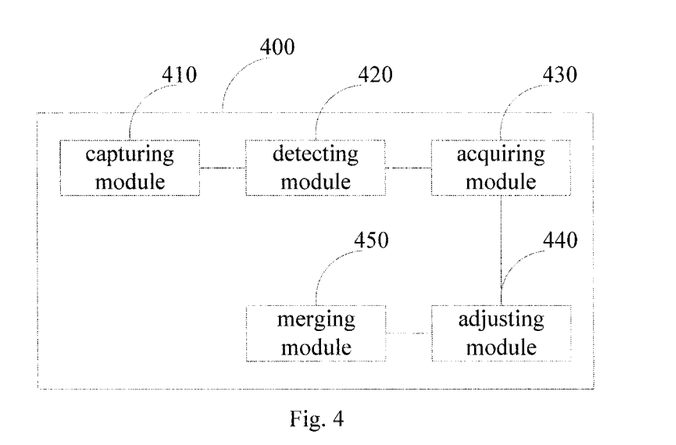
FIG. 4 is a block diagram illustrating a device for processing an image provided in embodiments of the present disclosure.

FIG. 4 is a block diagram illustrating a device for processing an image provided in embodiments of the present disclosure.

As illustrated in FIG. 4, the device 400 for processing an image includes a capturing module 410, a detecting module 420, an acquiring module 430, an adjusting module 440 and a merging module 450.

The capturing module 410 is configured to capture a target image.

The detecting module 420 is configured to detect capturing ambient information when the target image is captured.

In specific implementations, the detecting module 420 is configured to identify a first camera configured to capture the target image, to invoke a second camera to measure a light intensity. A capturing direction of the second camera is opposite to the capturing direction of the first camera. When measured light intensity is greater than a light intensity threshold, the detecting module 420 is further configured to determine an illumination angle of a light source for capturing included in capturing ambient information according to the measured light intensity.

Alternatively, the detecting module 420 is further configured to determine that a state of light rays for capturing is non-front lighting when the measured light intensity is not greater than a light intensity threshold.

The acquiring module 430 is configured to acquire a material required.

The adjusting module 440 is configured to adjust a default display effect of the material according to the capturing ambient information to obtain a target display effect matching with the capturing ambient information.

As a possible implementation of embodiments of the present disclosure, the adjusting module 440 is configured to acquire a target position selected on the screen. The target position is configured to set the material. The adjusting module 440 is further configured to deploy the material having the default display effect in a virtual stereoscopic space based on the target position and to build a virtual light source in the virtual stereoscopic space. The virtual light source is configured to illuminate the material at an illumination angle of the light source for capturing. The adjusting module 440 is further configured to acquire the target display effect presented by the material when the material is illuminated by the virtual light source at the illumination angle of the light source for capturing.

Alternatively, the adjusting module 440 is configured to perform a simulation on a stereoscopic model of the material to determine a high-brightness region and a shadow region in the stereoscopic model when the material is illuminated by the virtual light source at the illumination angle of the light source for capturing, and to adjust the default display effect according to the high-brightness region and the shadow region to obtain the target display effect.

As another possible implementation of embodiments of the present disclosure, the adjusting module 440 is configured, when the state of light rays for capturing is the non-front lighting, to perform a brightness adjustment and/or a color-saturation adjustment on the default display effect according to the light intensity measured by the second camera, to obtain the target display effect.

As still another possible implementation of embodiments of the present disclosure, the capturing ambient information includes a capturing angle. The adjusting module 440 is further configured to acquire the target position selected on the screen. The target position is configured to set the material. The adjusting module 440 is further configured to deploy the material having the default display effect in the virtual stereoscopic space based on the target position. The adjusting module 460 is further configured to adjust a view angle of the material having the default display effect according to the capturing angle in the stereoscopic space, to obtain the material having the target display effect.

Alternatively, the adjusting module 440 is configured to perform a simulation on the stereoscopic model of the material to obtain a visible region in the stereoscopic model when it is determined that the view angle is the capturing angle. Further, the adjusting module 460 is configured to adjust the default display effect according to the visible region to obtain the target display effect.

The merging module 450 is configured to merge the material having the target display effect with the target image, to obtain a merged image.

It is to be illustrated, foregoing explanations and descriptions made to embodiments of the method for processing an image may also be applicable to the device 400 for processing an image provided in embodiments, and details are not described herein again.

With the device for processing an image according to embodiments of the present disclosure, by capturing the target image, by detecting the capturing ambient information when capturing the target object, by acquiring the material acquired, by adjusting the default display effect of the material according to the capturing ambient information so as to obtain the target display effect matching to the capturing ambient information, and by merging the material having the target display effect with the target image, the merged image is obtained. Consequently, the display effect of the material may be automatically adjusted according to the capturing ambient information of a capturing environment where a captured object is located, thereby causing that the display effect of the material is adapted to the capturing environment, improving an effect of image processing and improving user's capturing experience.

In order to achieve above embodiments, embodiments of the present disclosure further provide an electronic device. The electronic device includes the device for processing an image provided in any of embodiments above.

Figure 5:
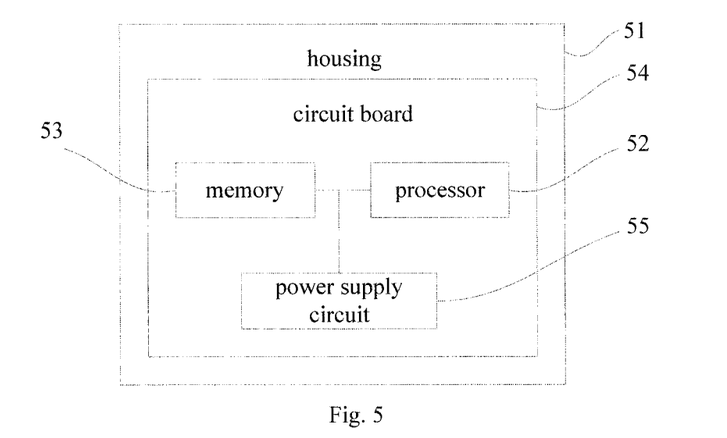
FIG. 5 is a schematic diagram illustrating an embodiment of an electronic device according to the present disclosure.

FIG. 5 is a schematic diagram illustrating an embodiment of an electronic device according to the present disclosure, which may implement flows of embodiments illustrated in FIGS. 1-3 according to the present disclosure. As illustrated in FIG. 5, the above electronic device may include a housing

51, a processor 52, a memory 53, a circuit board 54 and a power supply circuit 55. The circuit board 54 is enclosed by the housing 51. The processor 52 and the memory 53 are positioned on the circuit board 54. The power supply circuit 55 is configured to provide power for respective circuits or components of the above electronic device. The memory 53 is configured to store executable program codes. The processor 52 is configured to run programs corresponding to the executable program codes by reading the executable program codes stored in the memory 52, such that the followings are executed.

A target image is captured.

Capturing ambient information is detected when the target image is captured.

A material required is acquired.

A default display effect of the material is adjusted based on the capturing ambient information to obtain a target display effect matching to the capturing ambient information.

The material having the target display effect is merged with the target image, to obtain a merged image.

It is to be illustrated that the processor 52 may be configured to execute the method for processing an image provided in any of embodiments described above, and details are not described herein again.

Execution processes of the above performed by the processor 52 and blocks to be executed via the processor 52 by running the executable program codes may be referred to descriptions made to embodiments illustrated in FIGS. 1-3, which are not elaborated herein.

The electronic device may have various forms, including but not limited to the followings.

(1) A mobile communication device. This type of device has a capacity of mobile communication, and has a main function of providing voice, data communication. This type of device includes a smart phone (such as an iPhone), a multi-media phone, a functional phone and a low-level phone.

(2) A super-mobile personal computer device. This type of device pertains to a personal computer, having a capacity of computing and processing and generally having a capacity of accessing mobile Internet. This type of device includes: PDA (Personal Digital Assistant), MID (Mobile Internet Device) and UMPC (Ultra-mobile Personal Computer) devices, such as an iPad.

(3) Portable entertainment equipment. This type of device may display or play multi-medium content. This type of device includes: an audio and video player (such as iPod), a handheld game player, an E-book, intelligent playthings, and portable on-vehicle navigation equipment.

(4) A server. The server is a device for providing computing services. Components of the server include a processor, a hard disk, a memory, a systematical bus or the like. The server is similar to a general computer frame. Since it needs to provide highly reliable services, demands in aspects, such as processing capacity, stability, reliability, security, extensibility, manageability are relatively high.

(5) Other electronic devices having a capacity of data interaction.

In order to achieve above embodiments, embodiments of the present disclosure further provide a computer readable storage medium, having computer programs stored thereon. When the computer programs are executed by a processor, following may be executed.

A target image is captured.

Capturing ambient information is detected when the target image is captured.

A material required is acquired.

A default display effect of the material is adjusted based on the capturing ambient information to obtain a target display effect matching to the capturing ambient information.

The material having the target display effect is merged with the target image, to obtain a merged image.

It is to be illustrated that, when the computer programs are executed by the processor, the method for processing an image provided in any of embodiments described above may be executed, which is not elaborated herein.

In order to achieve above embodiments, embodiments of the present disclosure provide a computer program product. When instructions stored in the computer program product are executed by a processor, followings may be executed.

A target image is captured.

Capturing ambient information is detected when the target image is captured.

A material required is acquired.

A default display effect of the material is adjusted based on the capturing ambient information to obtain a target display effect matching to the capturing ambient information.

The material having the target display effect is merged with the target image, to obtain a merged image.

It is to be illustrated that, when the instructions stored in the computer program product are executed by the processor, the method for processing an image provided in any of embodiments described above may be executed, which is not elaborated herein.

In the description of the specification, terms such as "an embodiment," "some embodiments," "example," "a specific example," or "some examples," means that that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples described in the specification may be combined by those skilled in the art without contradiction.

In addition, terms such as "first" and "second" are configured herein for purposes of description and are not intended to indicate or imply relative importance or significance or implicitly indicate the number of indicated technical features. Thus, features defined as "first", "second" may explicitly or implicitly include at least one such feature. In the description of the present invention, the meaning of "a plurality of" is at least two, such as two, three, etc., unless specifically and specifically defined otherwise.

Any process or method described in a flow chart or described herein in other ways may be understood to include one or more modules, segments or portions of codes of executable instructions for achieving specific logical functions or acts in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art to which embodiments of the present disclosure is pertained.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise (a non-exhaustive list) but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of acts or methods may be realized by the software or firmware stored in the memory and executed by the appropriate instruction execution system. For example, when it is realized by the hardware, likewise in another embodiment, the acts or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the acts in the above exemplifying method of the present disclosure may be achieved by commanding the related hardware with programs. The programs may be stored in a computer readable storage medium, and the programs include one or a combination of the acts in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for processing an image, comprising:
    capturing a target image;
    detecting capturing ambient information when capturing the target image;
    acquiring a material required;
    adjusting a default display effect of the material according to the capturing ambient information to obtain a target display effect matching with the capturing ambient information; and
    merging the material having the target display effect with the target image to obtain a merged image;
    wherein detecting the capturing ambient information when capturing the target image comprises: identifying a first camera used for capturing the target image; invoking a second camera to measure a light intensity, wherein a capturing direction of the second camera is opposite to the capturing direction of the first camera; and when the measured light intensity is higher than a light intensity threshold, determining an illumination angle of a light source for capturing comprised in the capturing ambient information according to the measured light intensity.

2. The method according to claim 1, wherein adjusting the default display effect of the material according to the capturing ambient information to obtain the target display effect matching with the capturing ambient information comprises:
    acquiring a target position selected on a screen, wherein the target position is configured to set the material;
    deploying the material with the default display effect in a virtual stereoscopic space according to the target position;
    building a virtual light source in the virtual stereoscopic space, wherein the virtual light source is configured to illuminate the material at the illumination angle; and
    acquiring the target display effect presented by the material when the material is illuminated by the virtual light source at the illumination angle.

3. The method according to claim 2, wherein acquiring the target display effect presented by the material when the material is illuminated by the virtual light source at the illumination angle comprises:
    performing a simulation based on a stereoscopic model of the material to determine a high-brightness region and a shadow region in the stereoscopic model when the material is illuminated by the virtual source at the illumination angel; and
    adjusting the default display effect based on the high-brightness region and the shadow region to obtain the target display effect.

4. The method according claim 1, wherein, after invoking the second camera to measure the light intensity, the method further comprises:
    when the measured light intensity is not higher than the light intensity threshold, determining that a state of light rays for capturing comprised in the capturing ambient information is non-front lighting.

5. The method according to claim 4, wherein adjusting the default display effect of the material according to the capturing ambient information to obtain the target display effect matching with the capturing ambient information comprises:
    when the state of the light rays for capturing is non-front lighting, performing a brightness adjustment and/or a color-saturation adjustment on the default display effect to obtain the target display effect.

6. The method according to claim 1, wherein the capturing ambient information comprises a capturing angle, and adjusting the default display effect of the material according to the capturing ambient information to obtain the target display effect matching with the capturing ambient information comprises:
- acquiring a target position selected by a user on the screen, wherein the target position is configured to set the material;
- deploying the material with the default display effect in a virtual stereoscopic space according to the target position; and
- adjusting a view angle of the material having the default display effect according to the capturing angle in the virtual stereoscopic space, to obtain the material having the target display effect.

7. The method according to claim 6, wherein adjusting a view angle of the material having the default display effect according to the capturing angle in the virtual stereoscopic space, to obtain the material having the target display effect comprises:
- performing a simulation on a stereoscopic mode of the material, to determine a visible region of the stereoscopic model when the view angle is the capturing angle; and
- adjusting the default display effect according to the visible region, to obtain the target display effect.

8. A device for processing an image, comprising:
- a capturing module, configured to capture a target image;
- a detecting module, configured to detect capturing ambient information when the target image is captured;
- an acquiring module, configured to acquire a material required;
- an adjusting module, configured to adjust a default display effect of the material according to the capturing ambient information to obtain a target display effect matching with the capturing ambient information; and
- a merging module, configured to merge the material having the target display effect with the target image to obtain a merged image;
- wherein the detecting module is configured to: identify a first camera used for capturing the target image; invoke a second camera to measure a light intensity, wherein a capturing direction of the second camera is opposite to the capturing direction of the first camera; and determine an illumination angle of a light source for capturing comprised in the capturing ambient information according to the measured light intensity when the measured light intensity is higher than a light intensity threshold.

9. The device according to claim 8, wherein the adjusting module is configured to:
- acquire a target position selected on a screen, wherein the target position is configured to set the material; deploy the material with the default display effect in a virtual stereoscopic space based on the target position; build a virtual light source in the virtual stereoscopic space, wherein the virtual light source is configured to illuminate the material at the illumination angle; and acquire the target display effect presented by the material when the material is illuminated by the virtual light source at the illumination angle.

10. The device according to claim 9, wherein the adjusting module is configured to:
- perform a simulation based on a stereoscopic model of the material to determine a high-brightness region and a shadow region in the stereoscopic model when the material is illuminated by the virtual source at the illumination angel; and adjust the default display effect based on the high-brightness region and the shadow region to obtain the target display effect.

11. The device according to claim 8 wherein the detecting module is configured to:
- determine that a state of light rays for capturing comprised in the capturing ambient information is non-front lighting when the measured light intensity is not higher than the light intensity threshold.

12. The device according to claim 11, wherein the adjusting module is configured to:
- perform a brightness adjustment and/or a color-saturation adjustment on the default display effect to obtain the target display effect when the state of the light rays for capturing is non-front lighting.

13. The device according to claim 8, wherein the capturing ambient information comprises a capturing angle, and the adjusting module is configured to:
- acquire a target position selected by a user on the screen, wherein the target position is configured to set the material; deploy the material with the default display effect in a virtual stereoscopic space according to the target position; and adjust a view angle of the material having the default display effect according to the capturing angle in the virtual stereoscopic space, to obtain the material having the target display effect.

14. The device according to claim 13, wherein the adjusting module is configured to:
- perform a simulation on a stereoscopic mode of the material, to determine a visible region of the stereoscopic model when the view angle is the capturing angle; and adjust the default display effect according to the visible region, to obtain the target display effect.

15. An electronic device, comprising: a housing, a processor, a memory, a circuit board and a power supply circuit; wherein the circuit board is enclosed by the housing; the processor and the memory are positioned on the circuit board; the power supply circuit is configured to provide power for respective circuits or components of the electronic device; the memory is configured to store executable program codes; and the processor is configured to run programs corresponding to the executable program codes by reading the executable program codes stored in the memory, to:
- capture a target image;
- detect capturing ambient information when capturing the target image;
- acquire a material required;
- adjust a default display effect of the material according to the capturing ambient information to obtain a target display effect matching with the capturing ambient information; and
- merge the material having the target display effect with the target image to obtain a merged image,
- wherein, the processor is further configured, when the programs corresponding to the executable program codes are executed, to execute the following, so as to realize detecting the capturing ambient information when capturing the target image: identifying a first camera used for capturing the target image; invoking a second camera to measure a light intensity, wherein a capturing direction of the second camera is opposite to the capturing direction of the first camera; and when the measured light intensity is higher than a light intensity threshold, determining an illumination angle of a light source for capturing comprised in the capturing ambient information according to the measured light intensity.

16. The electronic device according to claim 15 wherein, the processor is further configured to execute the following, so as to realize adjusting the default display effect of the material according to the capturing ambient information to obtain the target display effect matching with the capturing ambient information:
    acquiring a target position selected on a screen, wherein the target position is configured to set the material;
    deploying the material with the default display effect in a virtual stereoscopic space according to the target position;
    building a virtual light source in the virtual stereoscopic space, wherein the virtual light source is configured to illuminate the material at the illumination angle; and
    acquiring the target display effect presented by the material when the material is illuminated by the virtual light source at the illumination angle.

17. The electronic device according to claim 16, wherein the processor is further configured to execute the following, so as to realize acquiring the target display effect presented by the material when the material is illuminated by the virtual light source at the illumination angle:
    performing a simulation based on a stereoscopic model of the material to determine a high-brightness region and a shadow region in the stereoscopic model when the material is illuminated by the virtual source at the illumination angel; and
    adjusting the default display effect based on the high-brightness region and the shadow region to obtain the target display effect.

* * * * *